June 4, 1946. F. C. KOCH 2,401,569
APPARATUS FOR EFFECTING INTIMATE CONTACT BETWEEN GASES AND LIQUIDS
Filed June 30, 1944 2 Sheets-Sheet 1

Inventor:
Fred C. Koch.
by Thiess, Olson Mecklenburger Attys

June 4, 1946.   F. C. KOCH   2,401,569
APPARATUS FOR EFFECTING INTIMATE CONTACT BETWEEN GASES AND LIQUIDS
Filed June 30, 1944   2 Sheets-Sheet 2
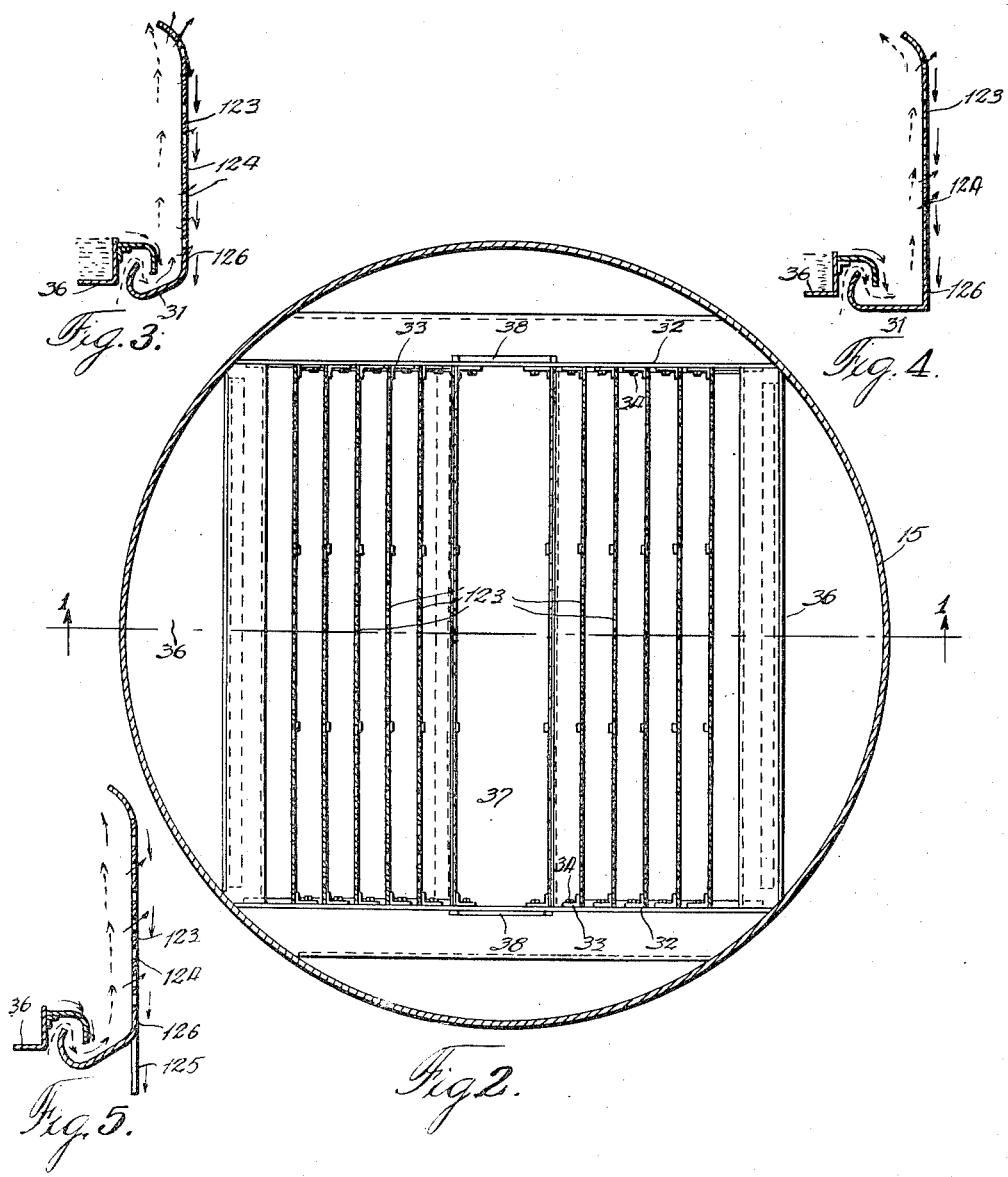

Patented June 4, 1946

2,401,569

UNITED STATES PATENT OFFICE 2,401,569

APPARATUS FOR EFFECTING INTIMATE CONTACT BETWEEN GASES AND LIQUIDS

Fred C. Koch, Wichita, Kans.

Application June 30, 1944, Serial No. 542,915

8 Claims. (Cl. 261—114)

The present invention relates to an improved apparatus for effecting intimate contact between gases and liquids.

This application is a continuation-in-part of my application Serial No. 500,513, filed August 30, 1943, now abandoned in favor of the present application.

The invention has particular applicability to the dephlegmation of vapors such as are encountered in various distillatory processes.

Fundamentally the present invention is predicated upon the principle of effecting a better exchange between gases and liquids, as for example, in a dephlegmator or other gas-liquid exchange device, and of securing a greatly increased capacity in a column of given diameter, by causing the ascending vapors or gases to reverse their flow and to take with them a certain amount of liquid which has been suitably fed into the vapor stream, and then to hurl the resulting mixture forcibly against, upon, or along intercepting means to change its direction and velocity, thence being flowed along screens, perforated plates, expanded metal sheets or any other means which will permit the subsequent separation of the liquid from the vapors or gas whereby the liquid will continue its eventual downward course through the exchange vessel (for instance, a dephlegmator) while the gas or vapor will continue to ascend and perhaps come in contact with liquid in similar exchange means.

It has already been proposed in the past to dephlegmate vapors or to contact gas with liquids in what is known as a bubble tower. Such bubble towers involve the use of so-called bubble decks through which extend short lengths of piping distributed equally all over the deck, above which there are suitably maintained caps having slotted or slitted sides and of sufficient height so that gas or vapor rising through the pipes will have its direction reversed by virtue of its contact with the inside of the caps, thereby being deflected to rise in the form of bubbles through liquid which is maintained in the plates usually at a height sufficient to cover the caps themselves so that all of the gas or vapor has to pass through a definite layer of liquid. As the vapor load increases, entrainment from deck to deck increases, thereby lowering the efficiency of each deck.

The conventional bubble deck may become inoperative when the vapor velocity leaving the caps becomes so great that it causes coning or blowing of the liquid away from the cap, or when the vapor pressure drop from deck to deck exceeds the static head of liquid in the downflows.

By the use of my device vapor velocities far in excess of those possible with a conventional bubble tower are possible. The maximum vapor load in the conventional tower is interdependent with the liquid load. This is true to a much less degree with my device. Under the most favorable liquid load for the bubble tower my device, in the same diameter of tower, will handle 50% more vapor, and at high liquid rates will handle more than 100% more vapor.

In accordance with the present invention, a better separation of the gases or vapor from the liquid, and a much higher capacity, is secured by employing means, preferably partially perforated plates, against which the mixture of gases and liquid are caused to impinge. A number of different ways of accomplishing this result are possible.

For a better understanding of the present invention, I have illustrated the same in a series of figures which show the following:

Fig. 2 is a horizontal section along the line 2—2 of Fig. 1;

Fig. 3 is a diagrammatic representation of the action of one of the troughs shown in Fig. 1; and Figs. 4 and 5 show modified forms of the troughs.

Figure 1:
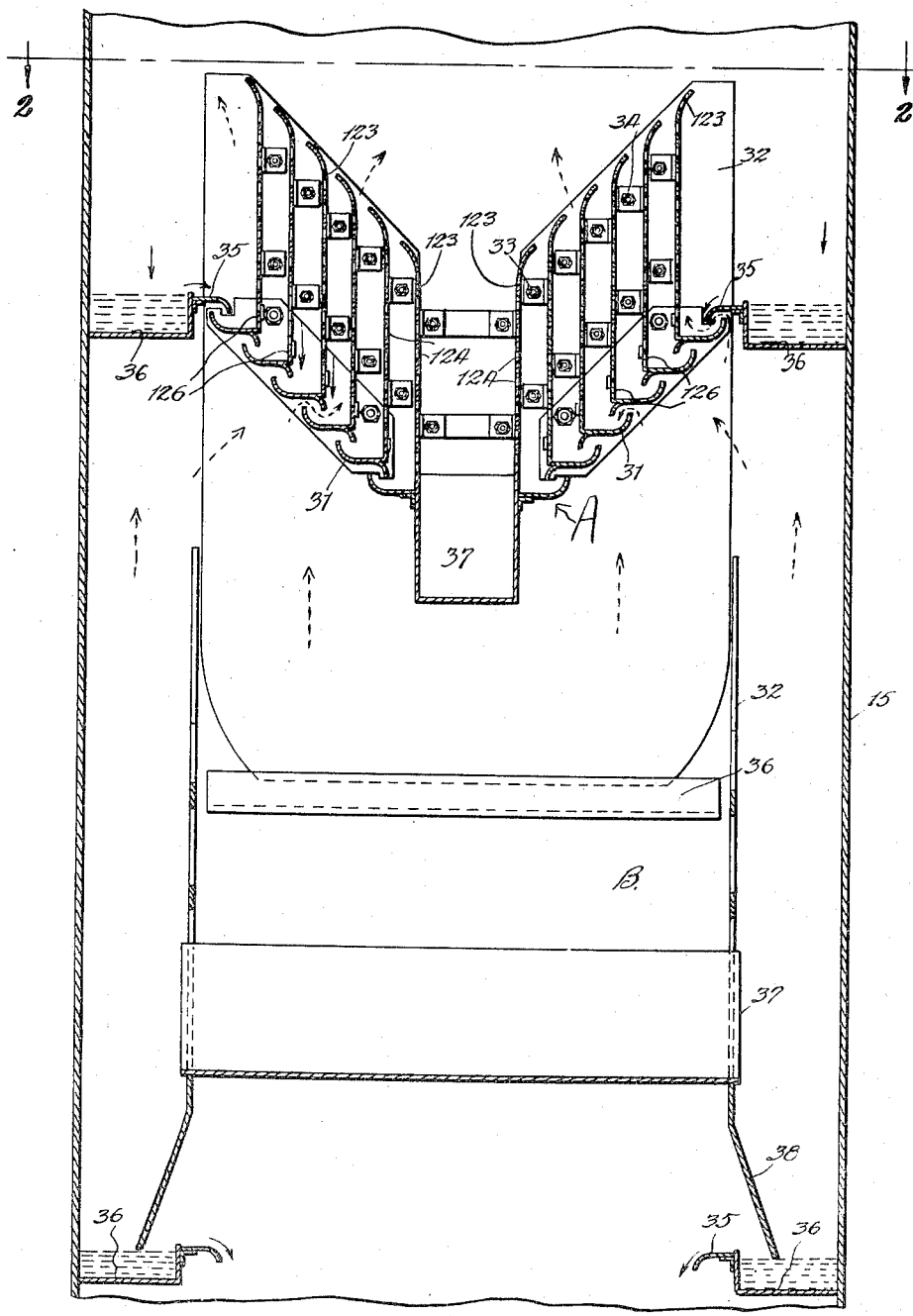
Fig. 1 is a vertical section, along the line 1—1 of Fig. 2, through a bubble tower of cascading type, with vertically extending partially foraminous contact or baffle plates.

In connection with the above figures it is to be understood that they are primarily diagrammatic and that they are not intended to be scaled drawings, or working drawings, but are primarily for the purpose of illustrating the fundamental principles of the invention which are a common denominator of all of the constructions illustrated.

It is to be understood that any reasonable mechanical modifications which, however, involve the fundamental principles of the present invention, are to be considered as within the true scope and intent thereof.

In its preferred embodiment, the invention is applied to a cascading type of exchange tower, but with the use of more or less vertically extending contact members, which may take the form of plates perforated along their upper portions, associated with vapor-reversing troughs. This preferred type of construction is shown in some detail in Figs. 1 and 2.

Within a suitable housing 15 there are suspended a series of horizontally extending cascade sections A and B, each alternate one being disposed at an angle of 90° relative to the other, and each section being provided with centrally disposed distributing boxes feeding into seal-pans from which liquid derived from a higher section is distributed to the cascading troughs.

Secured by suitable means to the housing 15 are transverse supporting plates 32 to which are secured, by means of angle-irons 33 and bolts or rivets 34, the baffle plates 123 which are formed integrally with the troughs 31, or are otherwise fastened thereto, so as to eventuate a transversely extending vapor-liquid exchanging deck A made up of a number of superimposed troughs 31 and the therewith associated baffle plates 123, arranged in staggered fashion so as to permit liquid fed onto the feed lip 35 to eventually flow downwardly from trough to trough.

The sources of this liquid are the seal-pans 36, into which liquid flows from a similar deck located on a higher level. At the top of a tower of such decks, the liquid will be suitably pumped to an initial set of seal-pans, as is well understood in the art of bubble-tower construction. The liquid, flowing down from trough to trough, in the manner hereinafter more fully described, finds its way eventually into the centrally located distributing box 37 which is open at each end and feeds liquid into the next lower set of seal-pans 36. For the sake of simplifying the drawing, the next lower section B of troughs and baffle plates is not shown in detail. It is, moreover, arranged at a 90° angle to the set A. The distributing box 37 of section B feeds over the apron 38 into the still lower located seal-pan 36, shown at the lowermost part of Fig. 1.

The downwardly flowing streams of liquid are fed into the thereto transversely flowing vapor streams. The resulting intimate mixture at high velocity strikes the solid portion 126 of the perforated plate 123, and is diverted upwardly along the perforated plates, thus having its direction suddenly changed. The mixture then flows turbulently upward along the perforated portions of the plates 123. The gas-and-liquid mixture flowing along the perforated plate 123, has a horizontal component tending to force the liquid, which, being heavier than the gas, thus has greater momentum, through the perforations. Some of the vapor also passes through the perforations. The liquid which separates flows mostly down the back of the perforated plate, i. e. the side opposite where the mixture first strikes it, and is fed into the next lower trough. The vapor which has not gone through the perforations continues its vertical path. Thus it is seen that the vapor and liquid are intimately mixed and the mixture is thrown against and along the imperforate portion 126 of the plate 123. The perforated portion of plate 123 separates out the liquid which is then again fed into the next lower vapor stream. No by-passing of vapor and liquid is possible. The contact is intense and in the case of the liquid is repeated. Due to the perforated plates, separation of liquid and vapor is practically complete, so a minimum of entrainment results.

The troughts 31 do not themselves permit overflow of liquid as their higher sides, formed by the integral baffle plates 123, prevent this. Therefore all of the liquid that finds its way into the troughs 31 will be forced to travel upwardly under the influence of the vapor streams, and only the liquid which passes through the perforations 124 can find its way to the next lower trough 31. Of course the liquid from the lowermost trough drops into the distributing box 37.

By arranging the decks at right angles to each other, each distributing box 37 can feed over the apron 38 into the next lower set of seal-pans 36. These seal-pans are segmental in shape, their outer boundary being the walls of the shell 15. Many different arrangements of these decks are obviously possible including concentric circular types.

To insure adequate separation of liquid from gas or vapor, the upper ends of the baffle plates 123 are bent backwardly as shown in Fig. 1.

By reason of the fact that the vapors or gases rising upwardly through the column have their direction suddenly changed as they try to pass through the space between the troughs 31, and as liquid is flowing and dripping into the troughs from each immediately higher baffle plate, a turbulent mixture of gas or vapor and liquid is thrown upwardly and will impinge against and flow out against the contact plates 123, some of the vapor and practically all of the liquid being forced through the openings 124 in the plates, the gases or vapors of course passing partly through the openings 124 and also escaping between the plates 123. In any event, the passage of liquid and vapors or gases through the openings 124 and the entire turbulence set up will effect a most intimate contact between the vapors and gases on the one hand and the liquid on the other, thus assuring a very effective type of liquid and gas exchange.

One of the troughs 31 and the plates 123 are illustrated on a somewhat enlarged scale in Fig. 3, in order better to illustrate the type of action and interaction between gaseous fluids and liquid fluids, and particularly the turbulence of the initial liquid pick-up in the cascading portion of the device.

Fig. 4 is similar to Fig. 3, but shows a modified form of trough which has a flat bottom and a right angle at the point where the plate 123 is attached, thus assuring a somewhat greater degree of turbulence due to the greater suddenness of the change in direction.

Fig. 5 illustrates a still further modification, which in most respects shows a construction similar to that of Fig. 3, but with a short section 125 depending below the baffle-plate 123 so as positively to direct liquid which flows down along the rear side of the baffle into the next lowermost trough 31.

The size of the baffles 123 is such that their perforated portion does not begin except at a locus on a level with, or above, the lip 35 of the liquid-feeding means, and at corresponding points so far as the lower baffles are concerned. In general, the perforated portions of the baffles 123 represent about fifteen-sixteenths of their extent, i. e. the lower one-sixteenth is imperforate.

The advantage inherent in the cascading type of construction is that the vapor reversal mechanism is beneath the vapor disengaging space of the adjacent trough, thereby making available considerably more area for vapor travel and disengaging space. Due to difference in elevation of the various troughs the transfer of liquid from one to the other is relatively easy even in large amounts.

In accordance with my present invention, as just described, I find that by extending one side of the troughs 31 in an upward direction in the form of plates 123, I can thereby secure a much greater capacity, and also excellent contact with very little entrainment. As the liquid, for instance as shown in Fig. 1, flows into the vapor stream, it is caught up by the vapor which creates a suction at this point, and the resulting mixture is thrown with considerable force, churned up, and hurled against the sides of the plates 123. This causes all of the mixture to travel upwardly as a turbulent foam or mist. A considerable amount of the vapor, with practically all of the liquid, is thus forced through the holes in the perforated plate, by reason of the fact that the liquid has the greater momentum. It will thus be seen that the contact takes place both in the trough between the perforated plates and also where the vapor and liquid conjointly pass through the perforations. After thus passing, the vapors and liquid separate, and the liquid flows downwardly on the plates 123 under the influence of gravity, and eventually feeds into the next trough, while the vapor, free from liquid, passes overhead to the next trough or section thereof. The mixture of vapor and liquid which passes through the perforations appears as froth on the face of the plate. The higher the rate of through-put of vapor and liquid the higher up on the face of the plate the frothing appears. The upward velocity of the liquid particles has been checked by passage through the perforations, with the result that the liquid particles coagulate and feed down into the succeeding trough whereas the separated vapor passes on upwardly.

As a result of the vapor velocity a considerable amount of centrifugal force is created which tends to separate liquid from vapor. As a result of this construction a much larger zone of contact is created than is provided in the usual type of old fashioned bubble tower. At the same time I obtain a much greater area for the vapor disengaging space than in the conventional type of bubble tower. The tower constructed in conformance with my present invention will work over an extremely wide range of vapor and liquid velocities. The pressure drop from one deck to the next varies only slightly with increase in liquid flow rate and at a constant vapor rate, and there is a sharp contrast in the type of operation over the conventional old fashioned bubble tower.

The particular advantage residing in the apparatus which I have invented lies in the fact that I secure most excellent contact between the gases on the one hand and the liquids on the other. By gases of course is to be understood any material which, under the temperature conditions prevailing in my apparatus, is in the gaseous instead of the liquid condition, and therefore the word "gases" in the claims is to be construed as including vapors.

Another advantage of the present apparatus is the fact that all of the liquid is fed into a rapidly moving and preferably streamlined vapor stream to produce an intimate turbulent mixture which is first hurled against a rigid intercepting surface at high velocity, with the result that the centrifugal forces thus brought into play will force most of the liquid and a considerable quantity of the vapor through the perforations provided in the upper portions of the baffles 123, as a result of which further contact takes place followed by a subsequent separation of the liquid which is then again fed into the vapor stream. It will be self-evident that the apparatus may differ considerably in constructional details from the apparatus described herein in connection with the drawings, provided that the fundamental principles involved are availed of. Fundamentally, therefore, the process which is effected by my improved apparatus involves the feeding of a liquid into a rapidly moving stream of a gas, or a mixture of gases to produce an intimate and turbulent mixture of gas and liquid followed by the forcible and positive impingement or hurling of said mixture against a rigid surface to suddenly change the direction of the entire mixture.

As a result of the sudden collision between this mass and the rigid surface, its velocity will be suddenly arrested and its direction changed. By reason of the momentum thus produced, the gas and the liquid will separate from each other, whereby the liquid will then, under the influence of gravity, tend to flow downwardly, only to be intercepted by further portions of the rapidly moving gas stream and again hurled against a suitable surface. The particular means by which the liquid is caused to flow into the gas stream need not necessarily be that described in the present apparatus, as the liquid may be pumped to a suitable elevation and then caused to flow out from suitable piping into a vapor stream, which may either be rapidly ascending in a tower or which may be discharging from a suitable nozzle or orifice. In other words, the main principle is the production of the turbulent mixture of gas and vapor so as to produce a mass which is moving with considerable velocity, whereupon the mixture is intercepted by some rigid intercepting means which causes its velocity suddenly to drop and the direction of the material to change. It is this sudden change in direction which is depended upon to a considerable extent to produce the desired effect.

Where the orientation of the rigid surface is such as to bring about a change of direction, there will also be a considerable development of centrifugal force which can be employed to force the mixture through the perforations in the upper parts of the rigid intercepting surface.

While I have described my invention in connection with a tower useful for the dephlegmation of vapors, for example those encountered in the fractional separation of hydrocarbons, or the separation of alcohols from other liquids with which they are admixed, it is of course to be understood that my apparatus can be employed for the adsorption of gases in absorbing liquid such as in the ammonia art, or for any other purpose in which intimate contact between a liquid on the one hand and a gaseous fluid on the other hand is to be effected.

Consequently I desire to have the hereunto attached claims construed liberally and mechanical modifications such as will occur to those skilled in the art to which this invention appertains may be construed as within the scope and intent thereof.

I claim:

1. A gas-liquid contact device for effecting more intimate contact between gas and a liquid which comprises a housing; liquid-flow-producing means therein for producing a plurality of sets of successive staggeredly positioned downwardly flowing sheet-like masses of liquid, each set being positioned below a previous such set; feeding means for supplying liquid to each of said sets, means, comprising the lower sides of said liquid-flow-producing means, for directing a plurality of generally upwardly flowing streams of gas substantially horizontally into each of said sheet-like masses of liquid, whereby to produce a series of turbulently and rapidly moving intimate mixtures of gas and liquid; and individual perforate means against which each of said mixtures is violently impelled so as to change its direction to the vertical, whereby to effect further contact between its constituents and a separation thereof into gas and liquid.

2. The device claimed in claim 1 in which the last mentioned individual perforate means comprises a series of upwardly extending plates imperforate at their lower portions, but provided with openings in major parts of their upper portions.

3. The device claimed in claim 1, in which the last mentioned individual perforate means are a series of upwardly extending partly foraminous partly curvilinear plates.

4. The device claimed in claim 1 in which the last mentioned individual perforate means are a series of upwardly extending perforated plates, each of which is provided with a downwardly extending imperforate extension serving to conduct liquid to a lower level.

5. A gaseous fluid and liquid exchange apparatus comprising a housing; potential liquid-supporting troughs therein; means for flowing liquid into said troughs; means for admitting gaseous fluid to said housing beneath said troughs; means including the lower sides of said troughs for causing said fluid to pass into the liquid that is flowing into said troughs with force sufficient to produce thereby a rapidly moving turbulent mixture of gaseous fluid and liquid, and plates attached to and extending upwardly from said troughs against which said projected mixture is impelled in its entirety, said plates being provided with openings along the major upper portions thereof.

6. A dephlegmator comprising a housing and therein disposed step-like superimposed potential liquid-holding troughs and means for forcing a gaseous fluid into liquid flowing thereinto, upwardly extending sides on said troughs against which sides the entire mixture resulting from the intermingling of the gaseous and liquid fluids is impelled in its entirety and caused to flow upwardly along said sides, said sides being provided with perforations on a major portion of the upper parts thereof.

7. A dephlegmator comprising a housing and a therein disposed series of superimposed potentially liquid-holding troughs one side of which is upwardly extended to a height many times greater than the depth of said trough, said side being provided with perforations beginning at a point a short distance above the potential liquid-level in said troughs, said troughs being superimposed in staggered step-like arrangement; means for feeding liquid into said troughs; means including the lower sides of said troughs for causing flow of a gaseous fluid into each of said troughs from a side opposite that extended as hereinabove defined whereby to intercept the liquid flowing into the troughs to produce an intimate mixture of the gaseous and liquid fluids which mixture is thereby violently impelled against the extended side and flows upwardly along the same as an agitated foam, some of the fluid passing through the aforementioned perforations whereby the liquid components of the mixture separate therefrom and flow downwardly under the influence of gravity to a lower trough.

8. The dephlegmator as defined in claim 7 in which the upwardly extending sides are curved near their upper ends in a direction to bring said upper ends into a vertical plane passing through the trough to which said side is attached.

FRED C. KOCH.